United States Patent [19]
Itoh

[11] Patent Number: 5,255,353
[45] Date of Patent: Oct. 19, 1993

[54] THREE-DIMENSIONAL SHADOW PROCESSOR FOR AN IMAGE FORMING APPARATUS

[75] Inventor: Takanori Itoh, Yokohama, Japan

[73] Assignee: Ricoh Company, Ltd., Tokyo, Japan

[21] Appl. No.: 870,228

[22] Filed: Apr. 20, 1992

Related U.S. Application Data

[63] Continuation of Ser. No. 485,484, Nov. 27, 1990, abandoned.

[30] Foreign Application Priority Data

Feb. 28, 1989 [JP]  Japan .................................. 1-47390
May 16, 1989 [JP]  Japan ................................ 1-122283

[51] Int. Cl.$^5$ ............................................. G06F 15/72
[52] U.S. Cl. ..................................... 395/126; 395/151; 345/139
[58] Field of Search ................ 395/126, 151; 340/729, 340/730, 735, 747, 790

[56] References Cited

U.S. PATENT DOCUMENTS

3,781,849  12/1973  Baron et al. ........................ 340/730
4,408,198  10/1983  Kudirka ......................... 340/730 X
4,680,720   7/1987  Yoshii ................................ 364/521

Primary Examiner—Mark K. Zimmerman
Attorney, Agent, or Firm—Oblon, Spivak, McClelland, Maier & Neustadt

[57] ABSTRACT

A three-dimensional shadow processor adds a three-dimensional shadow having a desired length to a character image included in input image data, in a predetermined direction. Whether or not a pixel of interest is a shadow area is determined by updating, delaying and counting data representative of the remaining length of a shadow on the basis of a set length of a shadow to be generated and image data associated with the pixel of interest. In response to the result of decision, either one of input image data and shadow data is selected and outputted.

4 Claims, 9 Drawing Sheets

THREE-DIMENSIONAL SHADOW PROCESSOR FOR AN IMAGE FORMING APPARATUS

This application is a continuation of application Ser. No. 07/485,484, filed on Nov. 27, 1990, now abandoned.

BACKGROUND OF THE INVENTION

The present invention relates to a device for use in an image forming apparatus for adding a three-dimensional shadow to an image.

While a modern image forming apparatus has various image processing capabilities, an extra capability which may be contemplated is the generation of a three-dimensional character image. Specifically, a three-dimensional character image is achievable by providing an input character image with a shadow in a predetermined direction, e.g., 45 degrees downward rightward direction and then outputting the resultant image. Especially, it is preferable that the length of the shadow be increasable as desired. A processor capable of implementing such three-dimensional character images reliably and economically has not be reported yet.

SUMMARY OF THE INVENTION

It is therefore an object of the present invention to provide a three-dimensional shadow processor for an image forming apparatus which is capable of adding a shadow having a predetermined length to, among input image data, a character image in a predetermined direction.

It is another object of the present invention to provide a three-dimensional shadow processor for an image forming apparatus which prevents a three-dimensional shadow from being added to a character or graphic image whose line width is small, noise image, etc.

A three-dimensional shadow processor for an image forming apparatus of the present invention comprises a shadow area specifying section for specifying a shadow area of input image data, a shadow data generating section for generating shadow data, and an image data selecting section for selectively outputting either one of the image data and the shadow data.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, an arrangement which may generally occur for implementing a three-dimensional shadow will be discussed with reference to FIG. 1. Specifically, FIG. 1 shows a three-dimensional shadow processing implementation which may be readily devised, although such an implementation itself is not known in the art.

As shown, the arrangement includes a decision block 1 which processes input image data to see if the data includes any image and produces a high level (H) if it does not include an image or a low level (L) if it includes an image. Four line buffers $2a$ to $2d$ are interconnected to delay an output of the decision block 1, i.e., an image decision signal by one scanning line each. A D flip-flop circuit is interconnected to the line buffers $2a$ to $2d$ in order to delay the outputs of the latter by one pixel. Specifically, a single D flip-flop $3a$ is associated with the line buffer $2a$, two D flip-flops $3b_1$ and $3b_2$ are associated with the line buffer $2b$, three D flip-flops $3c_1$ to $3c_3$ are associated with the line buffer $2c$, and four D flip-flops $3d_1$ to $3d_4$ are associated with the line buffer $2d$. In this configuration, the D flip-flop $3a$ produces data having been delayed by one scanning line plus one pixel, the D flip-flop $3b_2$ produces data having been delayed by two scanning lines plus two pixels, the D flip-flop $3c_3$ produces data having been delayed by three scanning lines plus three pixels, and the D flip-flop $3d_4$ produces data having been delayed by four scanning lines plus four pixels. Such outputs of the D flip-flops $3a$, $3b_2$, $3c_3$ and $3d_4$ are fed to a NOR gate 4. The output of the NOR gate 4 is interconnected to a NOR gate 5 together with the output of the decision block 1. The image data and shadow data which is generated by shadow generating means, not shown, are applied to a selector 6. The selector 6 selects either one of the image data and shadow data on the basis of the output of the NOR gate 5.

Figure 1:
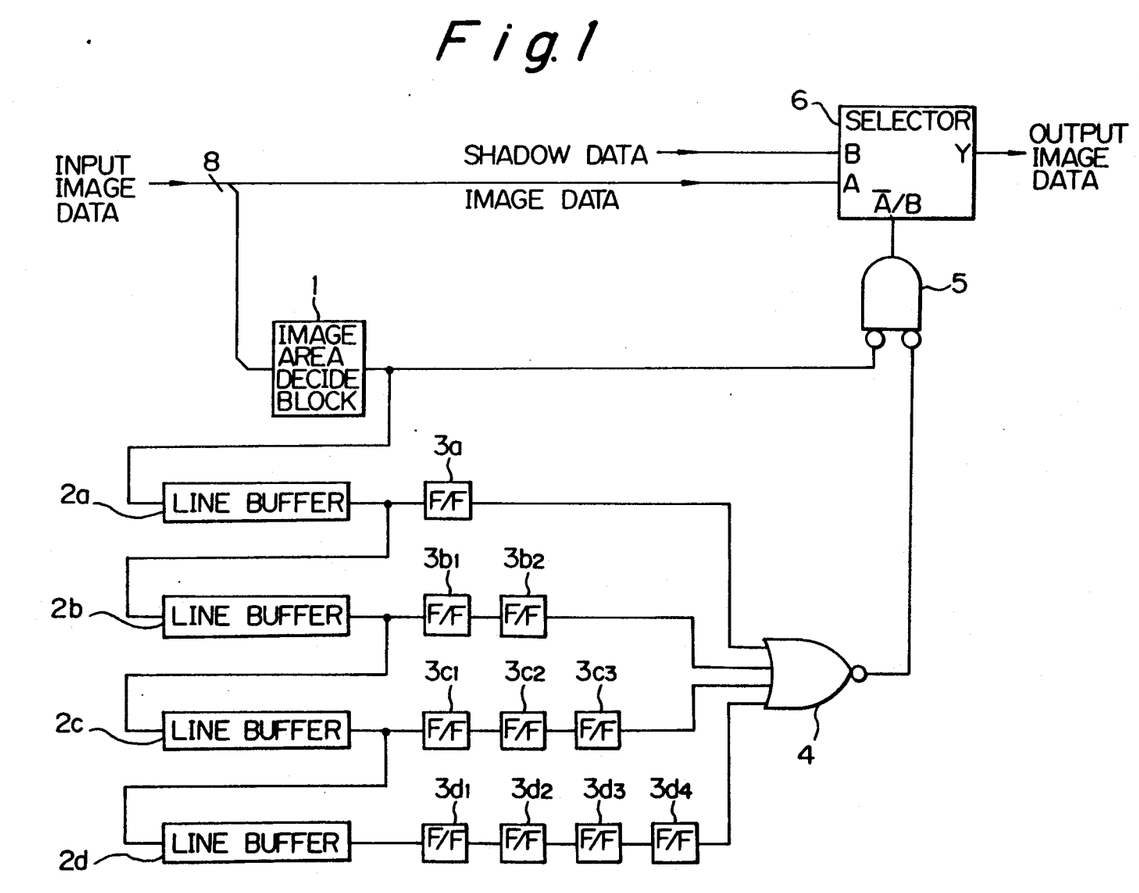
FIG. 1 is a schematic block diagram showing a specific arrangement which may be contemplated for adding a three-dimensional shadow to a character image.

The specific construction shown in FIG. 1 generates a shadow having a length which corresponds to a string of four pixels. Specifically, only when an image exists in any one of four successive pixels positioned 45 degrees upward and leftward of a pixel of interest, i.e., when the output of the NOR gate 4 is in a low level and, in addition, when no image exists in the pixel of interest, i.e., when the output of the decision block 1 is in a low level, the selector 6 selects the shadow data determining that the pixel of interest is a shadow pixel.

A problem with the implementation shown in FIG. 1 is that the length of a shadow cannot be increased with ease because the number of delay means including line buffers and flip-flops have to be increased in matching relation to the desired length of a shadow (four pixels in FIG. 1). For example, assuming that pixels are read in a density of 16 pixels per millimeter and that the desired length of a shadow is 16 millimeters or 256 pixels, at least 256 bits of line buffers are needed. With the implementation of FIG. 1, therefore, it is difficult to realize a processor capable of increasing the length of a shadow with a minimum of cost. Moreover, the increase in the components would degrade the reliability of operation.

Referring to FIGS. 2 to 6, a three-dimensional shadow processor embodying the present invention will be described.

Figure 2:
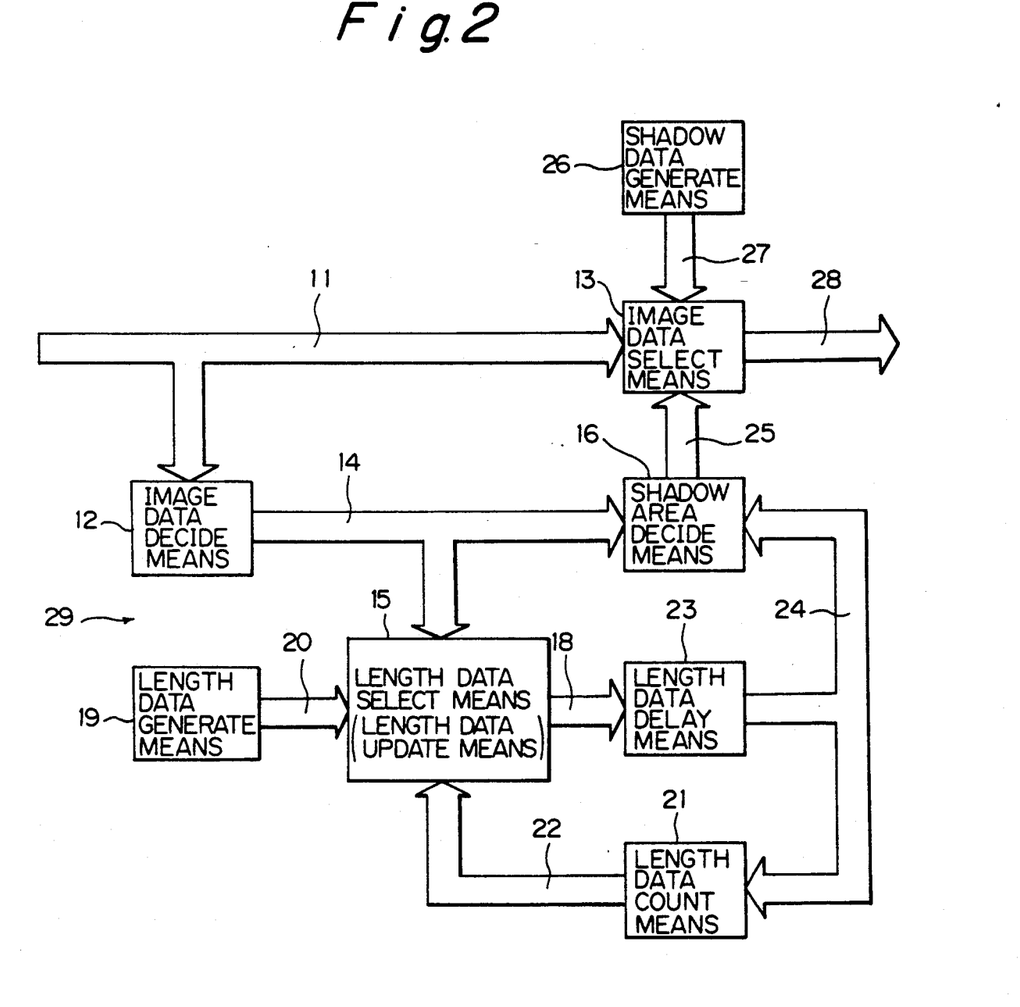
FIG. 2 is a block diagram schematically showing a three-dimensional shadow processor embodying the present invention.

The principle of the illustrative embodiment is shown in FIG. 2. As shown, this embodiment has image area decision means 12 and image data selecting means 13 to both of which an image data signal 11 is fed from image data generating means, or raster image inputting means, not shown. The image area decision means 12 processes the image data signal 11 to see if an image is present pixel by pixel and delivers the result of decision as an image area signal 14. The image area signal 14 is applied to length data selecting means 15 and shadow area decision means 16.

The length selecting means 15 also plays the role of shadow data updating means for updating data representative of the remainig length of a shadow. Specifically, the length selecting means 15 produces a remainder signal 18 which is the data representative of the remainder of the length of a shadow which it has updated in response to the image region signal 14. More specifically, length data generating means 19 produces a set length signal 20, while length data counting means 21 produces a remainder signal 22. The length selecting means 15 selects the signal 20 if the image area signal 14 is indicative of the presence of an image or selects the signal 22 if otherwise, thereby updating the remainder signal 18. It is to be noted that the set length signal 20 indicates a set length of a shadow to be generated.

The remainder signal 18 from the length data selecting means 15 is fed to length data delaying means 23. The length data delaying means 23 delays the remainder signal 18 by a time corresponding to one scanning line plus or minus several pixels, thereby producing a delayed remainder signal 24. The several pixels of margin of the delay time mentioned above stems from the fact that the necessary delay time depends on the direction in which a shadow is to be generated. The delayed remainder signal 24 is routed to the length data counting means 21 and shadow area decision means 16.

When the remaining length of a shadow represented by the delayed remainder signal 24 is 0, the remainder signal 22 from the length data counting means 21 is representative of the same data as the signal 24 (meaning that the remaining length of a shadow is 0). When the signal 24 indicates that the remaining length is not 0, the length data counting means 21 subtracts a predetermined length from the remaining length represented by the signal 24 and produces data representative of the resultant length as the remainder signal 22.

The shadow area decision means 16 processes the image area signal 14 and delayed remainder signal 24 to see if a shadow area exists pixel by pixel, delivering the result as a shadow area signal 25. Specifically, when the signal 14 indicates that an image is absent and the signal 24 indicates that the remaining length of a shadow is not 0, the decision means 16 determines that the pixel of interest is a shadow area.

The image data selecting means 13 selects either one of the image data signal 11 and a shadow data signal 27 in response to the shadow area signal 25. The shadow data signal 27 is generated by shadow data generating means and is the image data to be generated for those regions which are determined to be shadow regions. Although not shown in the figures, the output of the selecting means 13 is fed as an image data signal 28 to image data receiving means, or raster image signal outputting means, or the like. Thus, the selecting means 13 selects the shadow data signal 17 if the shadow area signal 25 is representative of a shadow area or selects the image data signal 11 if the latter is representative of a non-shadow area.

The image area decision means 12, shadow area decision means 16, length data updating means 15, length data generating means 19, length data counting means 21, and length data delaying means 23 constitute shadow area marking means 29 in combination.

With the construction shown and described, it is not necessary to delay the results of decision as to an image area and associated with a plurality of scanning lines as in the arrangement shown in FIG. 1. Specifically, updating, delaying and counting the data representative of the remaining length of a shadow in association with image data suffices. This allows a desired long shadow to be added by a memory having a small capacity.

In FIG. 2, the delayed remainder signal 24 from the length data delaying means 23 is applied to the length data counting means 21, while the remainder signal 22 from the length data counting means 21 is fed to the length data selecting means 15. Alternatively, an arrangement may be made such that the length data signal from the length data selecting means 15 is applied to length data counting means, a length data signal from the length data counting means is fed to length data delaying means, and a length data signal from the length data delaying means is fed to length data selecting means, i.e., the flow of signals shown in FIG. 2 may be reversed.

Referring to FIGS. 3 to 6, a more specific construction of the illustrative embodiment will be described. In this embodiment, the operation control is implemented by a frame sync signal $\overline{\text{FSYNC}}$ synchronous to the input/output image data signal, a line sync signal $\overline{\text{LSYNC}}$ synchronous to the scanning lines, and a pixel sync signal CLOCK synchronous to the pixels.

Figure 3:
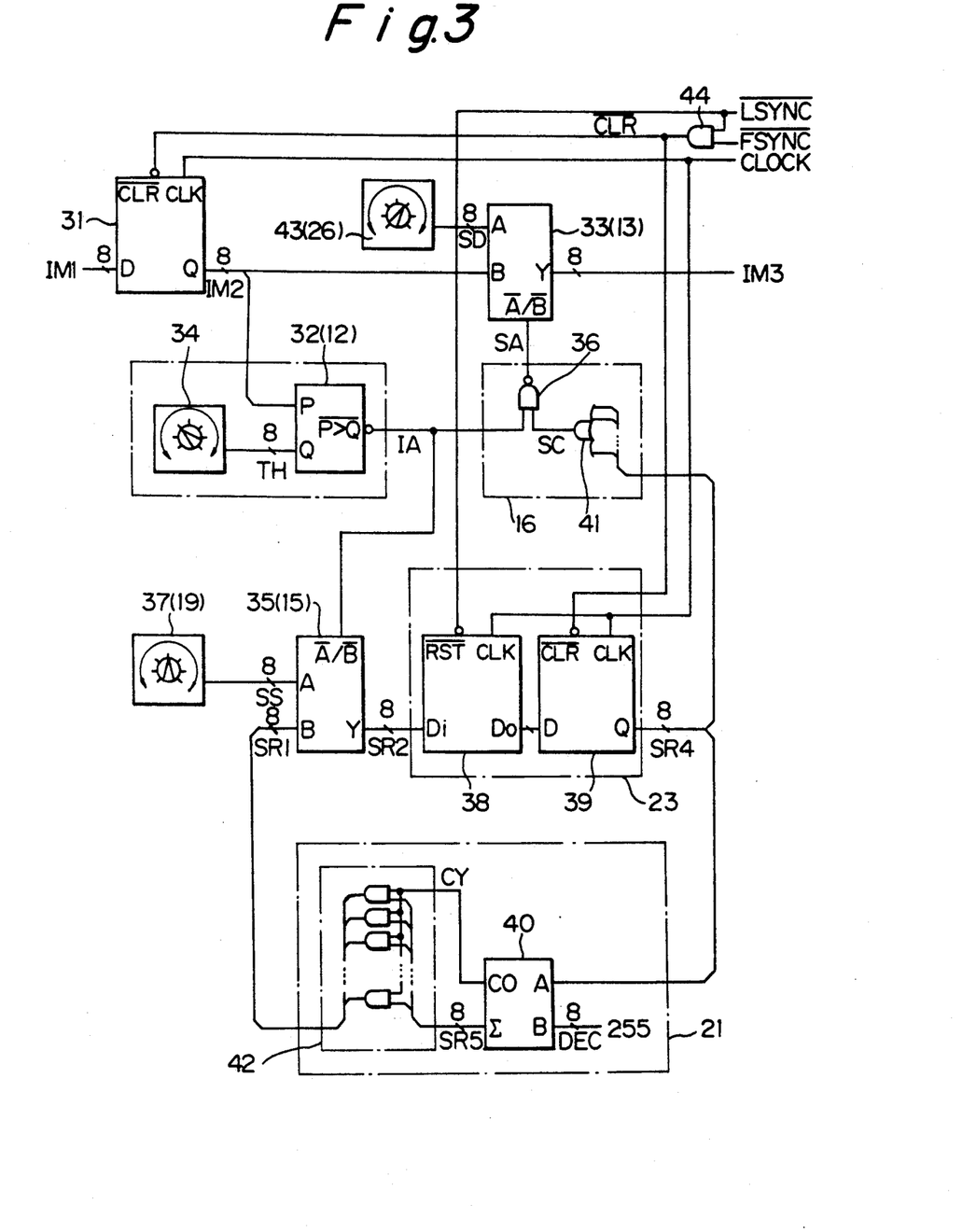
FIG. 3 is a block diagram showing the shadow processor of FIG. 2 more specifically.

An 8-bit image data signal IM1 fed from an image input unit, not shown, is applied to an input terminal D of a flip-flop 31. The flip-flop 31 outputs an 8-bit image data signal IM2 on its terminal Q in response to the pixel sync signal CLOCK which is applied to its terminal CLK. The image data signal IM2 is routed to an input terminal P of a comparator 32 and an input terminal B of a selector 33. The comparator 32 and selector 33 correspond to the image area decision means 12 and image data selecting means 13, respectively.

The comparator 32 compares the image data signal IM2 with an 8-bit threshold signal TH which is applied to its terminal, delivering the result of comparison as an image area signal IA via its terminal $\overline{P > Q}$. The threshold signal TH is representative of a threshold value for checking the individual pixels of the image data signal IM2 as to the presence/absence of an image. An exclusive switch 34 for threshold selection is provided on an operation board, not shown, and is accessible for selecting a particular threshold in matching relation to the density of a document. Hence, the image area signal IA from the comparator 32 shows the result of decision as to the presence/absence of an image. In the illustrative embodiment, the image area signal IA is in a low level when an image is present or in a high level when it is absent. The image area signal IA is applied to a select terminal $\overline{A/B}$ of a selector 35 and a 2-input NAND gate 36.

Corresponding to the length data selecting means 15, the selector 35 selects either one of an 8-bit set length signal SS applied to its terminal A and an 8-bit remainder signal SR1 applied to its terminal B, depending on the level of the input to the select terminal $\overline{A/B}$. Specifically, the selector 35 selects the signal SS or the signal SR1 when the input level is high and representative of the presence of an image or when it is low and indicative of the absence of an image. The signal SS or SR1 selected is outputted as an 8-bit remainder signal SR2 via a terminal Y. The set length signal SS is indicative of the length of a shadow to be generated. An exclusive switch 37 for setting a length (corresponding to the length data generating means) is also provided on the operation board and accessible for selecting a desired length which ranges from zero dot (no shadow) to 255 dots. The remainder signal SR2 is fed to an input Di of a line buffer 38.

The line buffer 38 receives the line sync signal $\overline{LSYNC}$ at its terminal $\overline{RST}$ and the pixel sync signal CLOCK at its terminal CLK. In response, the line buffer 38 delays the remainder signal SR2 by one scanning line and delivers the delayed signal as an 8-bit remainder signal SR3 via its terminal Do. For the line buffer 38, use may be made of a high-speed line memory μPD42505C available from NEC. The remainder signal SR3 from the line buffer 38 is routed to a terminal D of a flip-flop 39.

The flip-flop 39 cooperates with the line buffer 38 to constitute the length data delaying means 23. In response to the pixel sync signal CLOCK arriving at a terminal CLK, the flip-flop 39 further delays the remainder signal ST3 by on pixel and delivers the resultant signal as an 8-bit remainder signal SR4 via its terminal Q. The signal SR4 is applied to a terminal A of an adder 40 and input terminals of an 8-bit OR gate 41.

The adder adds the remainder signal SR4 and an 8-bit signal DEC representative of a fixed value (255 in the illustrative embodiment) which is applied to is terminal B. The resultant sum is outputted as an 8-bit remainder signal SR5 via a terminal Σ. At the same time, the adder 40 produces a carry signal CY on its terminal CO. The eight bits of the remainder signal SR5 are individually fed to the gate input terminals of a group of eight 2-input AND gates 42. Applied to the other input terminals of the AND gates constituting the group 42 is the carry signal CY also generated by the adder 40. Output signals of the individual AND gates are fed to the terminal B of the selector 35 as the remainder signal SR1.

Equivalently, therefore, the adder 40 subtracts 1 from the value of the delayed length signal SR4 and outputs the result via the AND gate group 42. In this sense, the adder 40 and AND gate group 42 play the role of the length data counting means 21. Assume that the value of the signal SR4 is 0 (meaning that the data representative of the remaining length of a shadow is 0). Then, the carry signal CY from the adder 40 goes low and, therefore, the value of the remainder signal SR1 from the AND gate group 42 also remains in 0 (meaning that the data representative of the remaining length of a shadow is 0), so that no substantial subtraction occurs.

The individual bits of the delayed remainder signal SR4 are applied to an OR gate 41 which then produces OR as a shadow candidate signal CS. The shadow candidate signal CS remains in a high level so far as the value of the remainder signal SR4 is not 0 (meaning that the data representative of the remaining length of a shadow is not 0). The signal SC is fed to the NAND gate 36 and serves as the shadow area decision means 16 together with the latter.

The output of the NAND gate 36 goes low when both the image area signal IA and the shadow candidate signal SC applied thereto are in a high level, i.e., when an image is absent and a shadow candidate is present. More specifically, the output signal of the NAND gate 36 indicates whether or not the pixel of interest being processed is a shadow area, i.e., it produces a low level when the pixel of interest is a shadow area. In this sense, the output signal of the NAND gate 36 will be referred to as a shadow area signal SA hereinafter. The shadow area signal SA is applied to the select terminal $\overline{A/B}$ of the selector 33.

When the input to the selector terminal $\overline{A/B}$ of the selector 33 is in a high level, i.e., when the pixel of interest is a shadow area, the selector 33 selects an 8-bit shadow data signal SD which is applied to its terminal A. When the input to the select terminal $\overline{A/B}$ is in a high level, i.e., when the pixel is not a shadow area, the selector 33 selects the image data signal IM2 fed to its terminal B. The signal SD or IM2 selected by the selector 33 is fed out via the terminal Y to an image output unit, not shown, as an 8-bit image data signal IM3. The value of the shadow data signal SD is representative of the density of a shadow to be generated and is variable over a range of 0 (white) to 255 (black) through an exclusive switch 43 which is also provided on the operation board.

A 2-input AND gate 44 receives the frame sync signal $\overline{FSYNC}$ and line sync signal $\overline{LSYNC}$ and in turn produces a clear signal $\overline{CLR}$. The clear signal $\overline{CLR}$ is applied to a terminal $\overline{CLR}$ of each of the flip-flops 31 and 39 and used to clear the flip-flops 31 and 39 at the leading end of a line of the image signal and to clear the line buffer 38 at the leading end of a frame of the same.

Figure 4A:
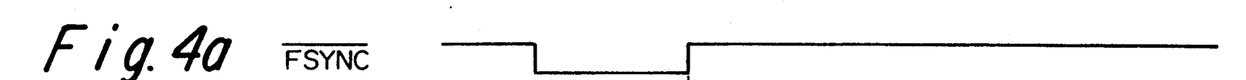
FIG. 4 is a timing chart representative of the operation of the illustrative embodiment.
Figure 4B:
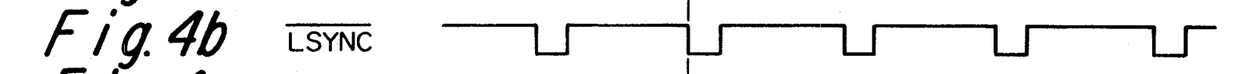
Figure 4C:
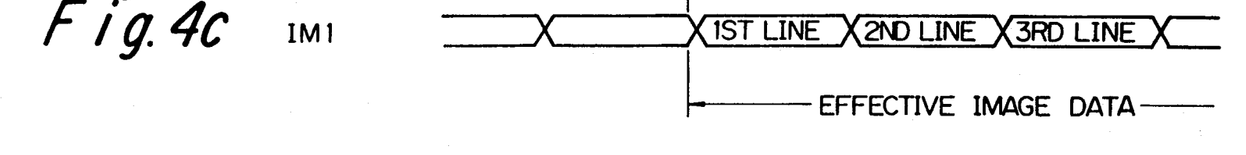

FIG. 4 indicates a relationship between the frame sync signal $\overline{FSYNC}$, line sync signal $\overline{LSYNC}$, and image data signal IM1. As shown, in the illustrative embodiment, the frame sync signal $\overline{FSYNC}$ goes low before an effective image data signal IM1 arrives. Then, in the construction shown in FIG. 3, the clear signal $\overline{CLR}$ also goes low resulting in the flip-flops 31 and 39 being cleared. The image data IM2, therefore, becomes 0 so that the image area signal IA goes high with no regard to the setting of the threshold set switch 34. As a result, the selector 35 selects the remainder signal SR1 and delivers it to the line buffer 38. The clear signal $\overline{CLR}$ further turns the remainder signal SR4 to 0 and thereby turns the carry signal CY to a low level, whereby the remainder signal SR1 from the AND gate group 42 becomes zero. Consequently, 0 is written to the line buffer 38 while the frame sync signal $\overline{FSYNC}$ is in a low level.

As shown in FIG. 4, in the illustrative embodiment, the frame sync signal $\overline{FSYNC}$ changes in synchronism with the negative-going edge of the line sync signal $\overline{LSYNC}$. The duration of the low level of the frame sync signal $\overline{FSYNC}$ is selected to be greater than one period of the line sync signal $\overline{LSYNC}$, so that the line buffer 38 is filled with 0 and cleared. On the change of the frame sync signal $\overline{FSYNC}$ from a low level to a high level, an image data signal representative of the first line begins to be inputted, as shown in FIG. 4. Subsequently, image data signals associated with the second line and successive lines are sequentially inputted in synchronism with the line sync signal $\overline{LSYNC}$.

Figure 5A:
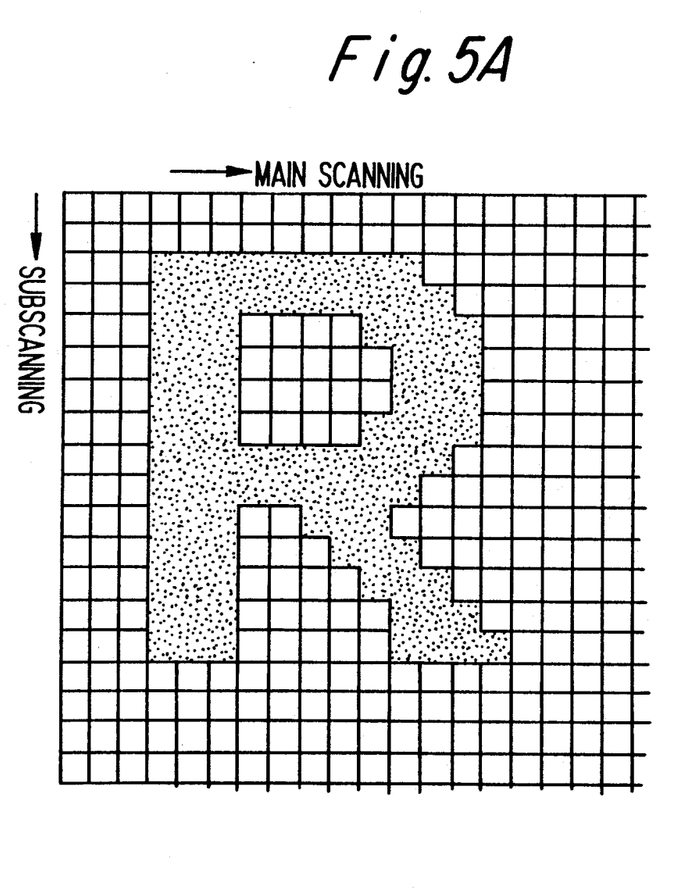
FIGS. 5A and 5B show respectively an exemplary input character image and a processed character image achievable with the illustrative embodiment.

The operation of the three-dimensional shadow processor shown in FIG. 3 will be described with reference to FIG. 6. Assume that an inputted image to be processed is in the form of a letter "R", as shown in FIG. 5A. In FIG. 5A, it is assumed that the white pixels have a value 0 while the black pixels (image areas) have a value 25. Frames shown in FIG. 5A are representative of pixel areas resulting from sampling which is effected in the main and subscanning directions, as indicated by arrows in the figure.

FIG. 6 indicates a relationship between the line sync signal $\overline{\text{LSYNC}}$, pixel sync signal CLOCK, image data signals IM1 and IM2, and remainder signals SR4 and SR2 which holds when an image is inputted to the processor shown in FIG. 3.

As shown in FIG. 6, in the illustrative embodiment, the line sync signal $\overline{\text{LSYNC}}$ changes in synchronism with the negative-going edge of the pixel sync signal CLOCK and remains in a low level over a period of time which is longer than one period of the pixel sync signal CLOCK. As FIG. 6 indicates, as the frame sync signal $\overline{\text{FSYNC}}$ goes high in synchronism with the negative-going edge of the line sync signal $\overline{\text{LSYNC}}$ (FIG. 4), image data representative of the first line of input image appears in the image data signal IM1. While image data D1 representative of the first pixel of each line appears in synchronism with the turn of the line sync signal $\overline{\text{LSYNC}}$ to a low level, image data D2 representative of the second pixel appears in synchronism with the positive-going edge of the pixel sync signal CLOCK which arrives for the first time after the positive-going edge of the line sync signal $\overline{\text{LSYNC}}$. Image data representative of the third pixel and successive pixels sequentially appear in synchronism with the positive-going edges of the pixel sync signal CLOCK.

In the input image shown in FIG. 5A, no image exists on the first line. Therefore, all of the values of the image data signal IM1 derived from the first line are 0. The value of the image data signal IM2 is delayed relative to that of the image data signal IM1 by one clock of the pixel sync signal CLOCK. While the line sync signal $\overline{\text{LSYNC}}$ is in a low level, the clear signal $\overline{\text{CLR}}$ is also in a low level, as stated earlier. Hence, during such a period of time, the value of the image data signal IM2 remains in 0. On the other hand, all the values of the remainder signal SR4 associated with the first line and fed from the flip-flop 39 are 0 because the line buffer 38 has been cleared by the frame sync signal $\overline{\text{FSYNC}}$. Further, since all the values of the image data signal IM2 associated with the first line are 0, the image area signal IA from the comparator 32 remains in a high level and, therefore, the remainder signal associated with the first line and fed from the selector 35 is 0.

Likewise, the second line of the input image shown in FIG. 5A has no images. Hence, all the values of the image data signals IM1 and IM2 and remainder signals SR4 and SR2 will be 0, although not shown or described specifically to avoid redundancy.

Regarding the image data representative of the third line, the image data signal IM2 changes to 255 after the positive-going edge of the line sync signal $\overline{\text{LSYNC}}$ and in synchronism with the positive-going edge of the fourth pixel sync signal CLOCK. Thereafter, the image signal IM2 turns to 0 again, in synchronism with the positive-going edge of the thirteenth pixel sync signal CLOCK. More specifically, the image data signal IM2 associated with the third line remains in 255 during the interval between the positive-going edge of the fourth pixel sync signal CLOCK, which occurs after the positive-going edge of the line sync signal $\overline{\text{LSYNC}}$, and the positive-going edge of the thirteenth pixel sync signal CLOCK. Such a condition will sometimes be simply referred to as "the value of the image data signal IM2 remains in 255 during the period of the fourth clock to the thirteenth clock" hereinafter.

At this instant, the remainder signal SR4 from the flip-flop 39 associated with the third line is still zero.

Assuming that the value of the threshold value TH is selected to be 128, then the image area signal IA from the comparator 32 remains in a low level during the period of the fourth clock to the thirteenth clock and in a high level during the other periods. If follows that the value of the remainder signal SR2 associated with the third line and fed from the selector 35 during the period of the fourth clock to the thirteenth clock is the value having been selected on the length set switch 37 and is 0 during the other periods. The timing chart shown in FIG. 6 is representative of a case wherein the value of the length set signal SS selected on the switch 37 is 2, i.e., the length of a shadow to be generated corresponds to two dots.

The fourth line of the input image shown in FIG. 5A will be processed as follows. The image data signal IM2 associated with the fourth line is 255 during the period of the fourth clock to the fourteenth clock and is 0 during the other periods. On the other hand, the values of the remainder signal SR4 associated with the fourth line and fed from the flip-flop 39 have been delayed relative to the third-line remainder signal SR2 by one clock of the pixel sync signal CLOCK. More specifically, the fourth-line remainder signal SR4 remains in 2 during the period of the fifth clock to the fourteenth clock and in 0 during the other periods. The remainder signal SR2 associated with the fourth line remains in the same value as the value selected on the length set switch 37, i.e., 2 during the period of the fourth clock to the fourteen clock and in 0 during the other periods.

The image data signal IM2 associated with the fifth line is 255 during the period of the fourth clock to the seventh clock and the period of the eleventh clock to the fifteenth clock and is 0 during the other periods. The fifth-line remainder signal SR4 from the flip-flop 39 has been delayed relative to the fourth-line remainder signal SR2 by one clock of the pixel sync signal CLOCK, i.e., 2 during the period of the fifth to the fifteenth clock and is 0 during the other periods. Consequently, since the image area signal IA remains in a low level during the period of the fourth clock to the seventh clock and the period of the eleventh clock to the fifteenth clock, the fifth-line remainder signal SR2 has the value selected on the length set switch 37 the above-mentioned periods. During the other periods, the fifth-line remainder signal SR2 assume values which are the results of subtraction effected with the remainder signal SR4, i.e., 1 during the period of the seventh clock to the eleventh clock and 0 during the other periods.

The value of the image data signal IM2 associated with the sixth line is 255 during the period of the fourth clock to the seventh clock and the period of the twelfth clock to the fifteenth clock and is 0 during the other periods. The sixth-line remainder signal SR4 from the flip-flop 39 has been delayed relative to the fifth-line remainder signal SR2 by one clock of the pixel sync signal CLOCK, i.e., it is 2 during the period of fifth clock to the eighth clock and the period of the twelfth clock to the sixteenth clock, 1 during the period of the eight clock to the twelfth clock, and 0 during the other periods. Hence, the sixth-line remainder signal SR2 is 2 during the period of the fourth clock to the seventh clock and the period of the twelfth clock to the fifteenth clock. The sixth-line remainder signal SR2 assumes the results of subtraction effected with the remainder signal SR4 during the other periods, i.e., 1 during the period of the fifteenth clock to the sixteenth clock and 0 during the other periods.

The image data signal IM2 associated with the seventh line is 255 during the period of the fourth clock to the seventh clock and the period of the twelfth clock to the fifteenth clock and is 0 during the other periods. The seventh-line remainder signal SR4 from the flip-flop 39 is 2 during the period of the fifth clock to the eight clock and the period of the thirteenth clock to the sixteenth clock, 1 during the period of the eight clock to the ninth clock and the period of the sixteenth clock to the seventeenth clock, and 0 during the other periods. Hence, the seventh-line remainder signal SR2 is 2 during the period of the fourth clock to the seventh clock and the period of the twelfth clock to the fifteenth clock. The seventh-line remainder signal SR2 assumes the results of subtraction effected with the remainder signal SR4, i.e., 1 during the period of the seventh clock to the eight clock and the period of the fifteenth clock to the sixteenth clock and 0 during the other periods.

Further, the image data signal IM2 associated with the eighth line is 255 during the period between the eleventh clock to the fourteenth clock and the period of the eleventh clock to the fourteenth clock and is 0 during the other periods. The eighth-line remainder signal SR4 from the flip-flop 39 is 2 during the period of the fifth clock to the eighth clock and the period of the thirteenth clock to the sixteenth clock, 1 during the period of the eight clock to the ninth clock and the period of the sixteenth clock to the seventeenth clock, and 0 during the other periods. It follows that the eighth-line remainder signal SR2 is 2 during the period of the fourth clock to the seventh clock and the period of the eleventh clock to the fourteenth clock. The eighth-line remainder signal SR2 assumes the results of subtraction effected with the remainder signal SR4 during the other periods, i.e., 1 during the period of the fourteenth clock to the sixteenth clock and 0 during the other periods.

On the other hand, the shadow area signal SA from the NAND gate 36 is in a low level when the value of the remainder signal SR4 is not 0 and the image area signal IA is in a high level, indicating that the pixel of interest has been determined to be a shadow area. As FIG. 6 indicates, the time when the image area signal IA goes high is coincident with the time when the value of the image data signal IM2 is 0. Hence, the pixel of interest is determined to be a shadow area when the remainder signal SR is not 0 and the image data signal IM2 is 0. IN FIG. 6, such a condition is satisfied during the period of the seventh clock to the eleventh clock of the fifth line, the period of the seventh clock to the twelfth clock and the period of the fifteenth clock to the sixteenth clock of the sixth line, the period of the seventh clock to the ninth clock and the period of the fifteenth clock to the seventeenth clock of the seventh line, and the period of the seventh clock to the ninth clock and the period of the fifteenth clock to the seventeenth clock of the eighth line. During these periods, the selector 33 selects the shadow data signal SD while, during the other periods, the selector 33 selects the image data signal IM2. Here, let the shadow data signal SD be assumed to be 128 as selected on the density select switch 43.

It will be seen that the ninth line and successive lines of the input image shown in FIG. 5A are processed in the same manner as the first to the eighth lines.

Figure 5B:
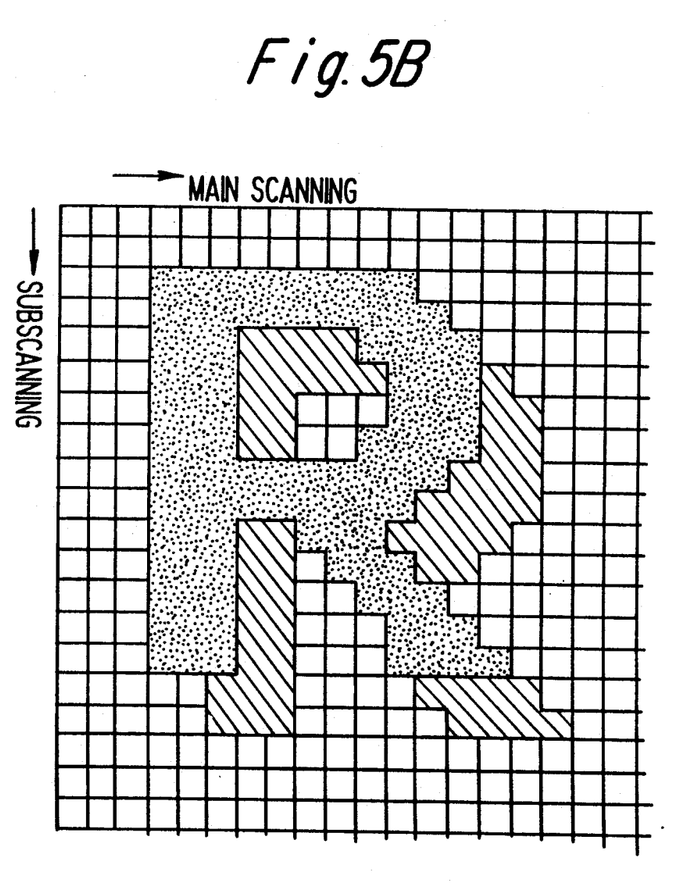
Figure 6A:
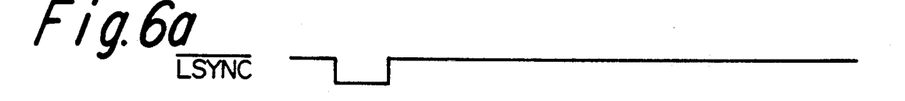
FIG. 6 is a timing chart.
Figure 6B:
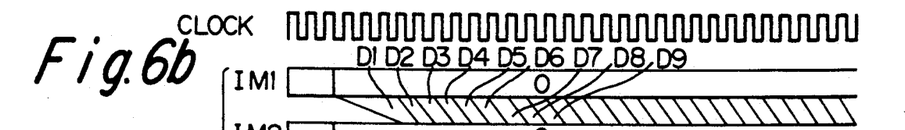
Figure 6C:
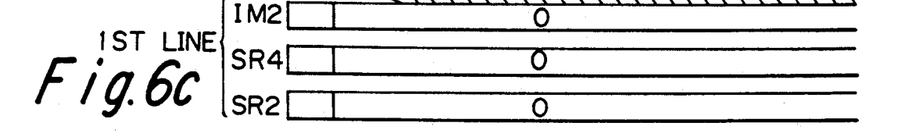
Figure 6D:
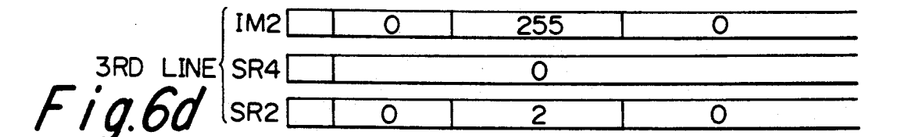
Figure 6E:
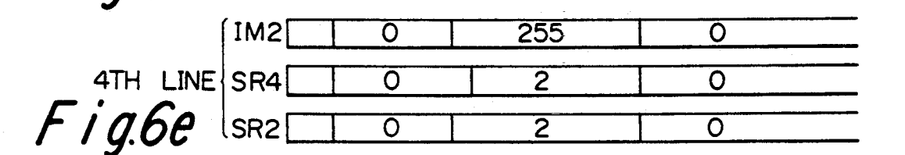
Figure 6F:
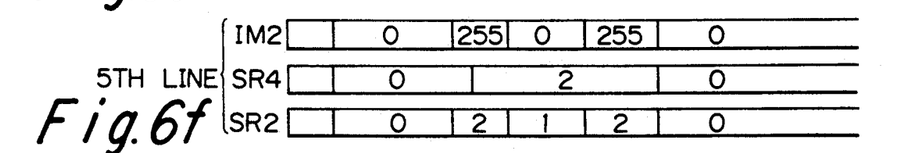
Figure 6G:
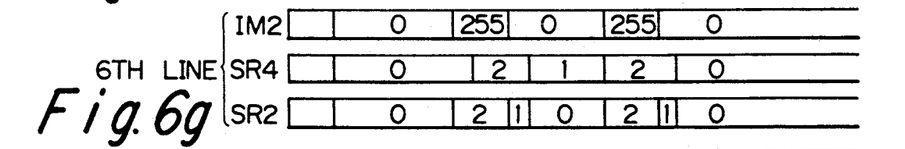
Figure 6H:
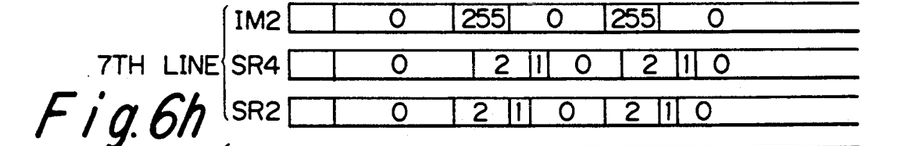
Figure 6I:
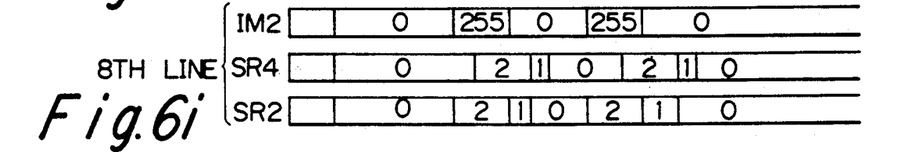

FIG. 5B shows the result of the shadow processing executed with the input image shown in FIG. 5A, i.e., a letter "R" with a shadow. In the figure, the shadow is indicated by hatching, and the value of the pixels forming the shadow is 128. The value of the pixels forming the white area is 0 while that of the pixels forming a black area (image) is 255, as in the input image of FIG. 5A. As shown, a three-dimensional shadow is added to the input image in a desired density as selected on the density set switch 43 and over a length of two dots, as measured in the 45 degrees downward and rightward direction, as selected on the length set switch 37.

In the construction shown in FIG. 3, the line buffer 38 and flip-flop 39 in cooperation provide a delay time corresponding to one scanning line plus one pixel, thereby adding a shadow to an input image in the 45 degrees downward rightward direction. If desired, a shadow may be oriented in any other direction by, for example, replacing the line buffer 38 and flip-flop 38 with respect to the order or by interconnecting flip-flops in multiple stages in such a manner as to provide a delay time corresponding to one scanning line plus or minus several pixels. Further, an arrangement may be made such that the delay time is variable to orient the shadow in any desired direction.

The comparator 32 responsive to the presence/absence of an image and the threshold set switch 34 are indispensable with the processor shown in FIG. 3, because the image signal is inputted in the form of multi-level data. The comparator 32 and threshold set switch 34 are omissible if the input image data is implemented as binary data. When the input image signal is implemented as binary data, the shadow data signal SD should advantageously be implemented as binary data also because the number of bits of the selector 33 will decrease. In such a case, the shadow data signal SD may be a periodic signal such as one attainable by counting the pixel sync signal CLOCK or the line sync signal $\overline{\text{LSYNC}}$, instead of the fixed value selectable on the density set switch 43, FIG. 3.

While the construction shown in FIG. 3 has been shown and described on the assumption that the input image is a monocolor image, the shadow processor of the present invention is similarly applicable to a full-color image.

The illustrative embodiment generates a shadow whose length can be increased up to 255 dots, simply by delaying an 8-bit remainder signal representative of the remaining length of a shadow by one scanning line plus one pixel. Hence, a three-dimensional shadow having a substantial length is achievable economically with a memory having a small capacity.

Figure 7:
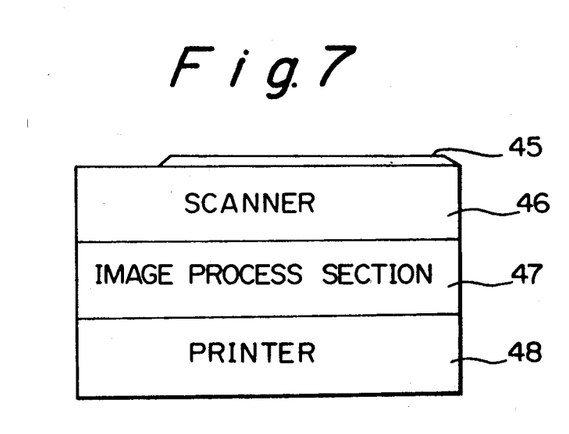
FIG. 7 schematically shows a digital copier to which an alternative embodiment of the shadow processor in accordance with the present invention is applied.

Referring to FIGS. 7 to 10B, an alternative embodiment of the present invention will be described. Generally, providing a character image or graphic image whose line width is small with a shadow is undesirable because the shadow is apt to shade the image itself and thereby render the latter illegible. The previous embodiment handles image data representative of only a single pixel of interest in determining whether or not an image is present, so that it will add a shadow even to a thin character image which is one dot wide, for example. Further, when the input image data includes noise (usually dot-like noise), a three-dimensional shadow will be added even to such a noise image to enlarge it and will thereby produce an undesirable spot on the resultant image. FIG. 7 schematically shows a digital copier to which the alternative embodiment which will be described is applicable. The digital copier has a scanner 46 provided with a glass platen 45, an image processing section 47, and a printer 48. In this type of copier, when the scanner 46 reads a document which is loaded on the glass platen 45 so as to output image data representative of the document, it is likely that spots on the document are introduced as noise images bringing about the above-mentioned problem. While such noise images may be removed by effecting exclusive processing before they are applied to image area decision means, it will erase thin lines of character images also and is therefore undesirable.

In the alternative embodiment, the image area decision means 12 is so devised as to determine whether or not an image is present on the basis of a plurality of image data, so that a shadow may not be added to thin images or similar images.

Figure 8:
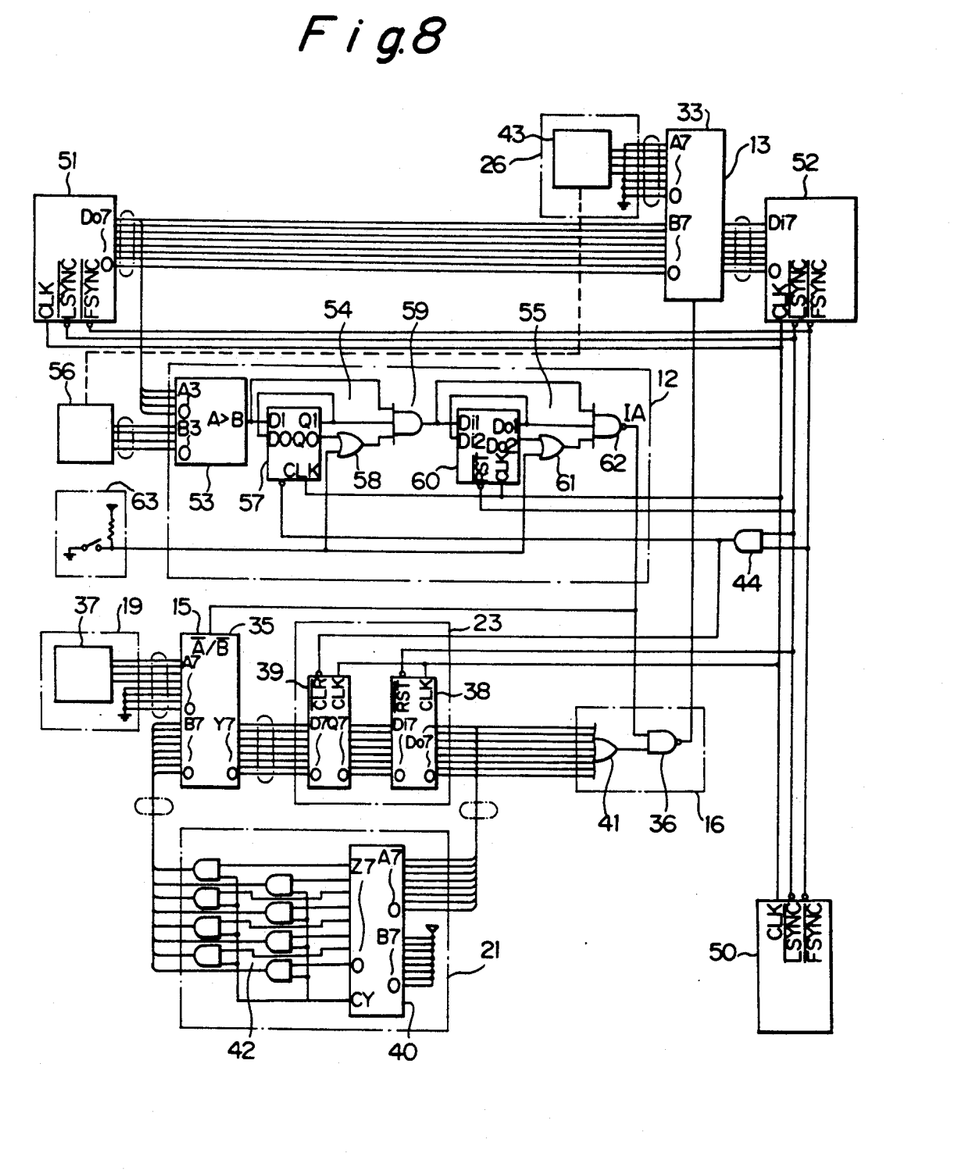
FIG. 8 is a schematic block diagram showing the embodiment of FIG. 7 more specifically.
Figure 9A:
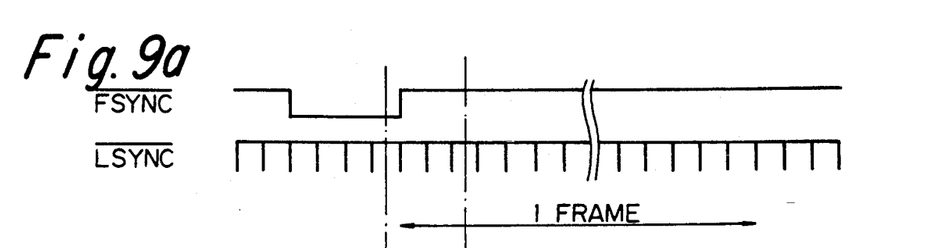
FIG. 9 is a timing chart.
Figure 9B:
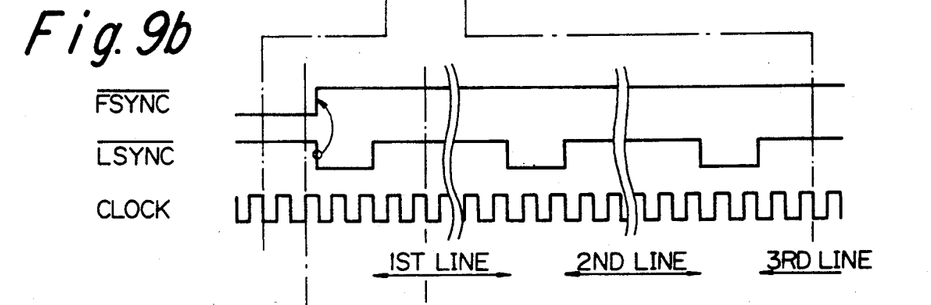
Figure 9C:
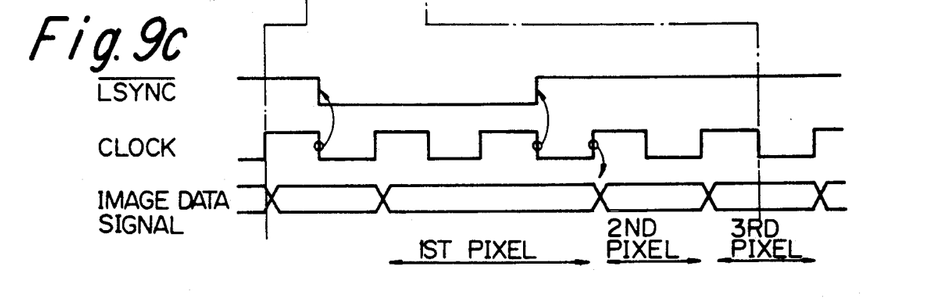

Referring to FIG. 8, there are shown a timing control circuit 50, image data generating means 51, and image data receiving means 52 which are omitted in FIG. 3 and the figures associated therewith. The timing generating circuit 50 generates the frame sync signal $\overline{FSYNC}$, line sync signal $\overline{LSYNC}$ and pixel sync signal CLOCK, as shown in FIG. 9. This circuit 50 controls the operation timings of the circuitry shown in FIG. 8. The image data generating means 51 outputs a raster type image data signal IM1 in synchronism with the above-mentioned signals. In this particular embodiment, the image data signal IM1 has eight bits and is representative of any one of 256 different densities (255 (dark) to 0 (light)). The image data signal IM1 is fed to the selector 33 and the image area decision means 12.

In the illustrative embodiment, the image area decision means 12 is composed of a comparator 53, and image detecting circuits 54 and 55 which are assigned to the main scanning direction and the subscanning direction, respectively.

The comparator 53 compares a signal IM2 which is the upper four bits of the image data signal IM1 and a 4-bit density level signal which is fed thereto from an exclusive switch 56 for selecting a density level. This threshold set switch 56 allows the operator to select any one of sixteen different density levels (four bits) in matching relation to the density of images to be processed. The comparator 53, therefore, produces a high level if the value of the image data signal IM1 is any one of 16, 32, . . . , 240 and greater than 256 as determined by the output of the threshold set switch 56, i.e., if there is a possibility that an image is present; if otherwise, it produces a low level. It is to be noted that since the image data signal IM1 will never exceed 256, the output of the comparator 53 remains in a low level in such a condition.

The image detecting circuit 54 assigned to the main scanning direction has a D flip-flop 57, OR gate 58, and an AND gate 59. The D flip-flop 57 is clocked by the pixel sync signal CLOCK which is fed to its terminal CLK, and it delays a signal arriving at its terminal D by a period of time corresponding to one pixel. The delayed signal appears on a terminal Q of the flip-flop 57. Hence, when the output signal of the comparator 53 remains in a high level over two or three successive pixels in the main scanning direction, the image detecting circuit 54 causes the AND gate 59 to produce a high level signal by determining that an image is possibly present. On the other hand, when the output signal of the comparator 53 is only one pixel wide or less in the main scanning direction, the image detecting section 54 determines that an image is absent.

The image detecting circuit 55 assigned to the subscanning direction has a FIFO (First-In First-Out) memory 60, an OR gate 61 and a NAND gate 62. The FIFO memory 56 is operated in synchronism with the line sync signal $\overline{LSYNC}$ and the pixel sync signal CLOCK which are applied to its terminals $\overline{RST}$ and CLK, respectively. The FIFO memory 56 delays a signal fed to its terminal Di by one scanning line and delivers the delayed signal via its terminal Do. Hence, when the signal fed from the comparator 53 and outputted by the AND gate 59 via the previously stated image detecting circuit 54 is in a high level over two or three successive pixels in the subscanning direction, the image detecting circuit 55 causes the AND gate 62 to produce a low level image area signal IA by determining that an image is present. When the signal from the AND gate 59 is only one pixel wide or less in the subscanning direction, the image detecting circuit 55 determines that an image is absent and turns the image area signal IA to a high level.

Figure 10A:
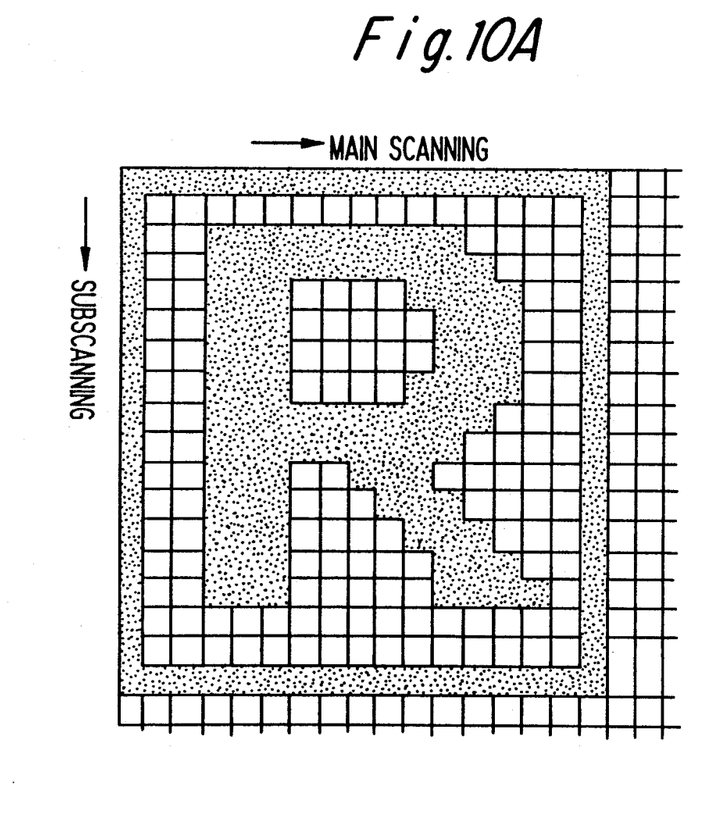
FIGS. 10A and 10B show examples of a non-processed and a processed character image associated with the alternative embodiment.
Figure 10B:
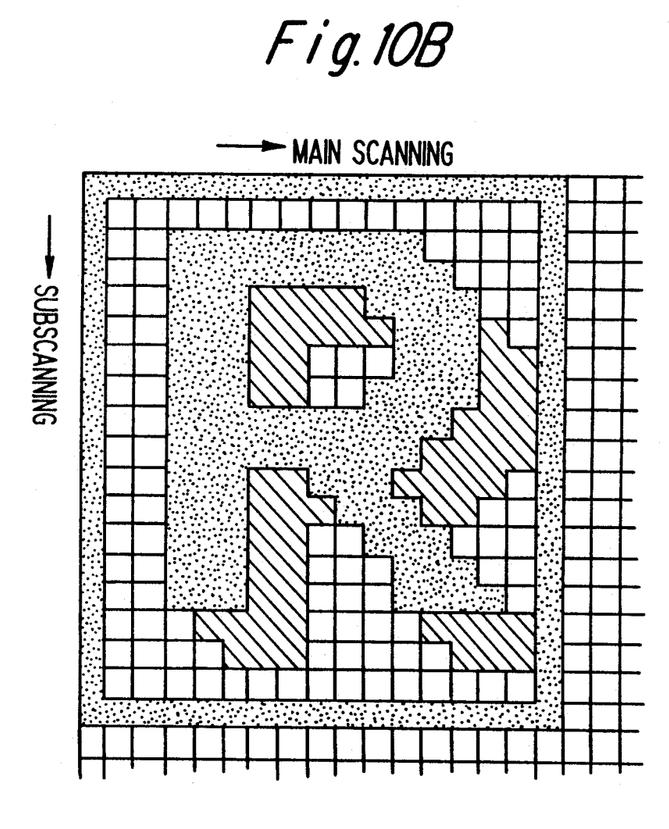

Processing which follows the above-described decision is the same as the processing of the previous embodiment except that it uses the image area signal IA which is derived from a plurality of image data signals IM1. Hence, when a character image, graphic image or noise image which is only one pixel wide or so is inputted, this embodiment does not determine that an image is present and thereby prevents a three-dimensional shadow to be added to such an image. Stated another way, the illustrative embodiment adds a shadow only to character images and graphic image each having a substantial line width. More specifically, this embodiment prevents a character having a small line width, for example, from being shaded by a shadow and thereby rendered illegible, or prevents a noise image from being emphasized by a shadow. Assume that a character image which is two pixels or three pixels wide and a frame-like image which is only one pixel wide exist together, as shown in FIG. 10A. Then, this embodiment will add a shadow only to the thick character image and not to the thin frame-like image.

The legibility of a character with a shadow is effected by the balance between the line width of a character and the length of a shadow. With the previous embodiment, it is possible to select the length of a shadow by using the length set switch 37. However, when the length of a shadow is increased to match it to character images whose line width is comparatively large, character images having a comparatively small line width tend to become illegible.

To eliminate the above tendency, the alternative embodiment incorporates in the image area decision means 12 a pixel number select switch 63 which functions as data number selecting means. The pixel number select switch 63 is interconnected to the OR gates 58 and 61. The switch 63 is manipulated by the operator on the basis of the line widths of images to be processed, i.e., it is operable to select a two-pixel decision mode or a three-pixel decision mode. Specifically, when the switch 63 is turned off, both the OR gates 58 and 61 produce a high level continuously. In this condition, when the output of the comparator 53 or that of the AND gate 59 is in a high level over two successive pixels, it is determined that an image is present. When the switch 63 is turned on, it is not determined that an image is present unless the output of the comparator 53 or that of the AND gate 59 is in a high level over three consecutive pixels.

As stated above, this embodiment allows the operator to select the line width of images which should be accompanied by three-dimensional shadows. It follows that a three-dimensional shadow can be added without effecting the legibility of characters and other images whose line width is small.

In FIG. 8, the rest of the construction and operation is similar to that of FIG. 3 and associated figures. A difference is that in this embodiment the length set switch 37 is capable of generating sixteen different shadow lengths, i.e. 0, 16, 32, . . . , 240 pixels. Another difference is that the density set switch 43 of the illustrative embodiment is interlocked with the threshold set switch 62 and capable of having values of 8, 16, . . . , 120. Specifically, the shadow data signal SD has a value which is one half of the threshold value selected on the threshold set switch 62. Hence, an image portion and a shadow portion have clearly distinguishable values, so that a three-dimensional shadow can be added while insuring the legibility of an image.

While the line width of an image to which a shadow is to be added has been shown and described as being two or three successive pixels, it will be seen that the circuit arrangement of the image area decision means 12 may be modified to adopt four or more successive pixels as the line width.

In summary, in accordance with the present invention, whether or not a pixel of interest is a shadow area can be determined simply by updating, delaying and counting, based on a set length of a shadow produced by length data generating means and image data of the pixel of interest, the data which is representative of the remaining length of a shadow. Therefore, even a shadow having a substantial length is achievable by executing the updating, delaying and counting processing with the remaining length of the shadow. Such a procedure can be implemented by a memory having a small capacity, i.e., it is not necessary to delay and hold the results of decision on image data of a plurality of scanning lines themselves. When image area decision means is so constructed as to determine whether or not an image is present on the basis of a plurality of image data and to allow the result of decision for shadow/non-shadow processing, it is possible to prevent a shadow from being added to character and graphic images whose line width is small, noise images, etc. This is successful in insuring the legibility of images and preventing noise images from being enlarged. Further, data number selecting means will allow the operator to select a desired line width of a character or similar image to which a shadow should be added, realizing a three-dimensional shadow which is desirably balanced with the image.

Various modifications will become possible for those skilled in the art after receiving the teachings of the present disclosure without departing from the scope thereof.

What is claimed is:

1. A three-dimensional shadow processor for an image forming apparatus, comprising:
   shadow data generating means for generating shadow data;
   shadow area specifying means coupled to said shadow data generating means for specifying a portion of an input image which will have a shadow area produced based upon input image data and in which said shadow data generating means comprises,
   length data generating means coupled to said shadow data generating means for generating a set value of a length of a shadow to be generated;
   image area decision means for determining whether or not an image is present on the basis of said input image data;
   length data delaying means for delaying data representative of a remaining length of a shadow in a main scanning direction and subscanning direction;
   length data counting means coupled to said length data delaying means for counting data representative of a remaining length of a shadow;
   length data updating means coupled to said length data delaying means, said length data generating means and said length data counting means for selecting, on the basis of a result of decision by said image area decision means, either one of data delayed by said length data delaying means and representative of a remaining length of a shadow counted by said length data counting means and length data generated by said length data generating means, and updating data representative of any remaining length of a shadow in relationship with a predetermined value;
   shadow area decision means for determining a shadow area in response to said image data and said data representative of a remaining length of a shadow having been updated and delayed after said selecting; and
   image data selecting means for selectively outputting either one of said input image data and said shadow data responsive to an output from said shadow area decision means.

2. A processor as claimed in claim 1, wherein said image area decision means determines whether or not an image is present on the basis of a plurality of image data which are applied thereto from said image data generating means.

3. A processor as claimed in claim 2, wherein said image area decision means comprises data number selecting means for selecting the number of image data to be used for decision;
   said image area decision means further determining whether or not an image is present on the basis of said image data and by using said number of image data selected by said data number selecting means.

4. A three-dimensional shadow processor for an image forming apparatus, comprising:
   image data generating means for generating image data;
   image data decision means for determining whether or not an image is present on the basis of said image data;
   length data generating means for generating a set value of a length data of a shadow to be generated;
   length data counting means for generating first remaining length data;
   length data updating means for selecting, on the basis of a result of decision by said image data decision means, either one of said first remaining length data generated by said length data counting means and said set value of said length data generated by said length data generating means, and for generating second remaining length data, said length data counting means subtracting a predetermined length data from said second remaining length data;

image data delaying means for delaying said second remaining length data in a main scanning direction and subscanning direction;

shadow area decision means for determining a shadow area on the basis of said second remaining length data generated by said length data updating means and said result of decision by said image data decision means;

shadow data generating means for generating shadow data; and image data selecting means for selectively outputting, on the basis of a result of decision by said shadow area decision means, either one of said image data and said shadow data.

* * * * *